United States Patent [19]
Lucht et al.

[11] 3,932,199
[45] Jan. 13, 1976

[54] PROCESS FOR THE FLAME-SCARFING OF FAULTY AREAS

[75] Inventors: Alfred Lucht, Bickenbach; Erwin Henn, Urbach, both of Germany

[73] Assignee: Messer Griesheim GmbH, Frankfurt am Main, Germany

[22] Filed: July 17, 1973

[21] Appl. No.: 379,974

[30] Foreign Application Priority Data
Aug. 4, 1972  Germany............................ 2238460

[52] U.S. Cl............... 148/9 C; 148/9.5; 266/23 H; 427/223; 427/289
[51] Int. Cl.² ....................... B23K 7/00; B23K 9/00
[58] Field of Search ............ 117/105.2, 46 FS, 4 R; 266/23 K, 23 R, 23 S, 23 H; 148/9.5, 9 C

[56] References Cited
UNITED STATES PATENTS

| | | | |
|---|---|---|---|
| 2,149,825 | 3/1939 | Albertson et al. | 117/2 |
| 2,186,096 | 1/1940 | Bucknam | 266/23 H |
| 2,904,449 | 9/1959 | Bradstreet | 117/105.2 |
| 2,920,001 | 1/1960 | Smith et al. | 117/105.2 |
| 2,968,083 | 1/1961 | Lentz et al. | 117/2 R |
| 3,158,499 | 11/1964 | Jenkin | 117/2 R |
| 3,667,981 | 6/1972 | Esnoult et al. | 117/2 R |
| 3,695,600 | 10/1972 | Munch et al. | 266/23 K |

FOREIGN PATENTS OR APPLICATIONS

| | | |
|---|---|---|
| 1,016,102 | 9/1957 | Germany |
| 1,193,342 | 5/1965 | Germany |

*Primary Examiner*—William D. Martin
*Assistant Examiner*—Shrive P. Beck
*Attorney, Agent, or Firm*—Connolly and Hutz

[57] ABSTRACT

A process for flame scarfing places of errors or surface defects on a work piece such as ingots, slabs or the like, by means of at least one flame-scarfing torch is characterized by raising and/or accelerating the flame-scarfing torch from its flame-scarfing position prior to the end of the place of error without changing the other flame scarfing parameters.

13 Claims, 4 Drawing Figures

PROCESS FOR THE FLAME-SCARFING OF FAULTY AREAS

BACKGROUND OF THE INVENTION

The metal work pieces prepared in ingot or slab casting processes often have individual faults or surface defects, such as cracks for example, on their surface which do not permit the further processing of the work piece in a rolling mill. These faults may be spaced relatively far apart on the large area of ingots or slabs. In order to remove all these faults in the surfaces, one has turned to the selective flame-scarfing of the surfaces, i.e. flame-scarfing only there where the surface faults are present. It is possible without difficulties to process the entire surface of a work piece, but this becomes uneconomical particularly when such a surface has only a single fault, for example.

The selective flame-scarfing of surfaces is already known (German application No. 1,193,342). In this known selective flame-scarfing process, the flame-scarfing oxygen flow is maintained at a value which is required for flame-scarfing the full length of the fault. At the end of the fault, the flow of oxygen is gradually diminished. The disadvantage in this known flame-scarfing process, however, is that upon completion of the procedure there remains on the work piece surface unburned iron covered with slag, which subsequently must be removed by supplemental flame scarfing. In addition, it is disadvantageous here that because of the reduction of oxygen flow at the end of the flame-scarfing course, there results an angular termination, whose side edges lie deeper than the surface not scarfed. Prior to further processing, these edges must be flame-scarfed again, since these faults cannot be equalized in the rolling of the work piece. Because of this usually manual after-processing of the work piece, the entire selective flame-scarfing procedure thus requires relatively much time.

SUMMARY OF THE INVENTION

It is therefore the object of the present invention to provide a process for the selective flame-scarfing of work piece surfaces according to which, upon the completion of the selective flame-scarfing procedure, iron residues and edges at the end of the fault are no longer present, and a surface is obtained which needs no further processing.

The problem according to the invention is solved in that at the end of the fault, the forward movement of the flame-scarfing torch is increased and/or the flame-scarfing torch is raised from its flame-scarfing position without alteration of the other flame-scarfing parameters.

For the achievement of a good flame-scarfing start, it is furthermore advantageous if at the beginning of the flame-scarfing procedure, there are simultaneously turned on at the fault heating gas mixture, air blast, flame-scarfing powder as well as flame-scarfing oxygen.

It is furthermore advantageous if the operating forward motion is provided to be 10 m/min. and the fast forward motion 30 m/min. In other words the fast forward motion is substantially greater than, and more particularly three times as great as the normal operating forward motion.

For the obtainment of a smooth surface of the work piece, it is furthermore advantageous if a lateral overlapping of the flame-scarfing slag is prevented by air blasting.

For the execution of the novel process, any flame-scarfing machine may be employed. Particularly suitable is a flame-scarfing machine in accordance with U.S. Ser. No. 69,821, filed Sept. 4, 1970, now U.S. Pat. No. 3,695,600 the details of which are incorporated herein by reference thereto. Such a flame-scarfing machine is illustrated in the attached drawing.

THE DRAWINGS

DETAILED DESCRIPTION

Figure 1:
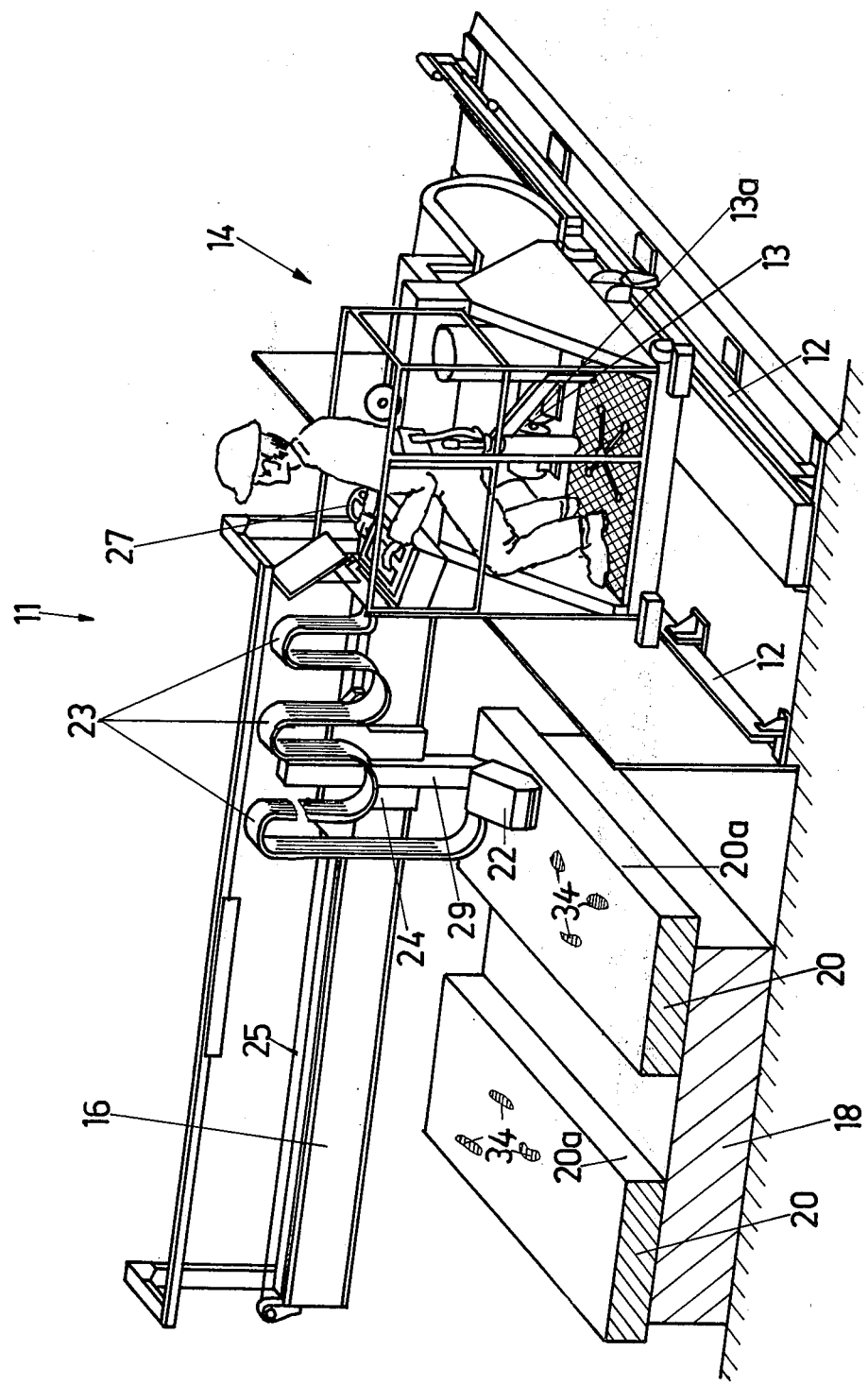
FIG. 1 is a perspective view of the flame-scarfing machine.

In FIG. 1 is illustrated a flame-scarfing machine 11 for the execution of the selective flame-scarfing process. This machine may be moved longitudinally on guide rails 12 and has a control compartment 14 for the person controlling the machine. For moving the flame-scarfing machine in rails 12, there is provided a motor 13 arranged in the control compartment 14. The motor has a gear unit 13(a) by means of which it is possible to move the flame-scarfing machine at different forward and reverse speeds, e.g. a normal forward speed, which may be between 6 and 12 m/min. and may be selected during the flame spraying. The advance speed may then be accelerated up to 35 m/min. (fast motion); this is from about 3 to 6 times greater than the normal speed. The same holds true of course for the reverse movement of the flame-scarfing machine. Here too different speeds may be selected in the event it becomes necessary.

As further shown in FIG. 1, in the area of the control compartment 14 there is arranged a boom 16 on the machine, which extends over the work piece support 18. Support 18 serves for supporting one or more work pieces 20. Mounted cross-movably on boom 16 by means of a torch carriage 24 is a flame-scarfing torch 22, which is supplied by means of conduits 23 with the operating media (oxygen, fuel gas, etc.). Such a flame-scarfing torch is disclosed, for example, in U.S. Pat. No. 3,398,898, the details of which are incorporated herein by reference thereto.

While the cross-movement (along boom 16) of the torch carriage 24 in the exemplary embodiment according to FIG. 1 occurs by means of a chain drive 25 activated by a handwheel 27, the elevation adjustment of the flame-scarfing torch 22, with reference to its torch carriage 24 arranged on boom 16, is undertaken by a pneumatic-hydraulic device (not shown here for the sake of simplicity) which is accommodated in torch carriage 24. In the activation of this device, bearing bracket 29 supporting the flame-scarfing torch 22 moves according to the control direction up and/or off with reference to carriage 24. Furthermore, flame-spraying torch 22 may also be turned about itself (e.g. by 90°) about an axis pointing into the flame-scarfing direction, so that — in the event it may become necessary — the side surfaces may be selectively flame scarfed.

Figure 2:
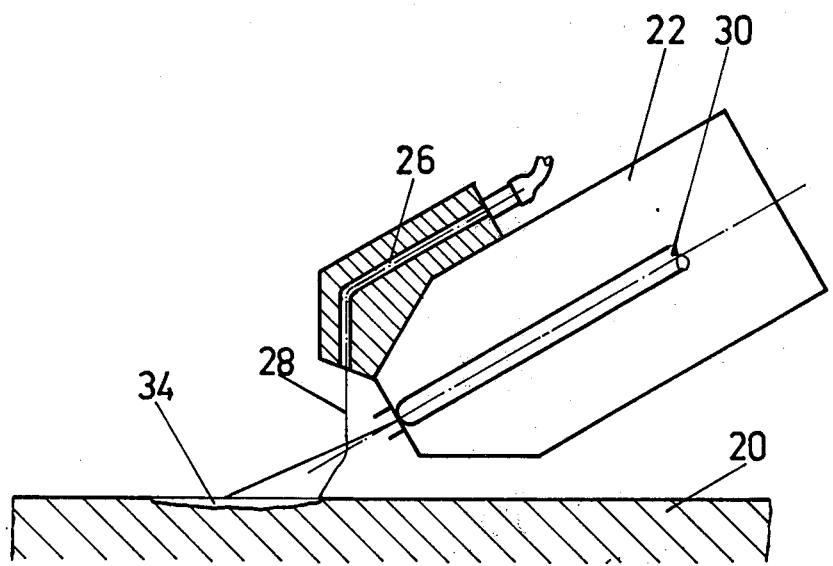
FIG. 2 is a side view of the flame-scarfing torch.
Figure 3:
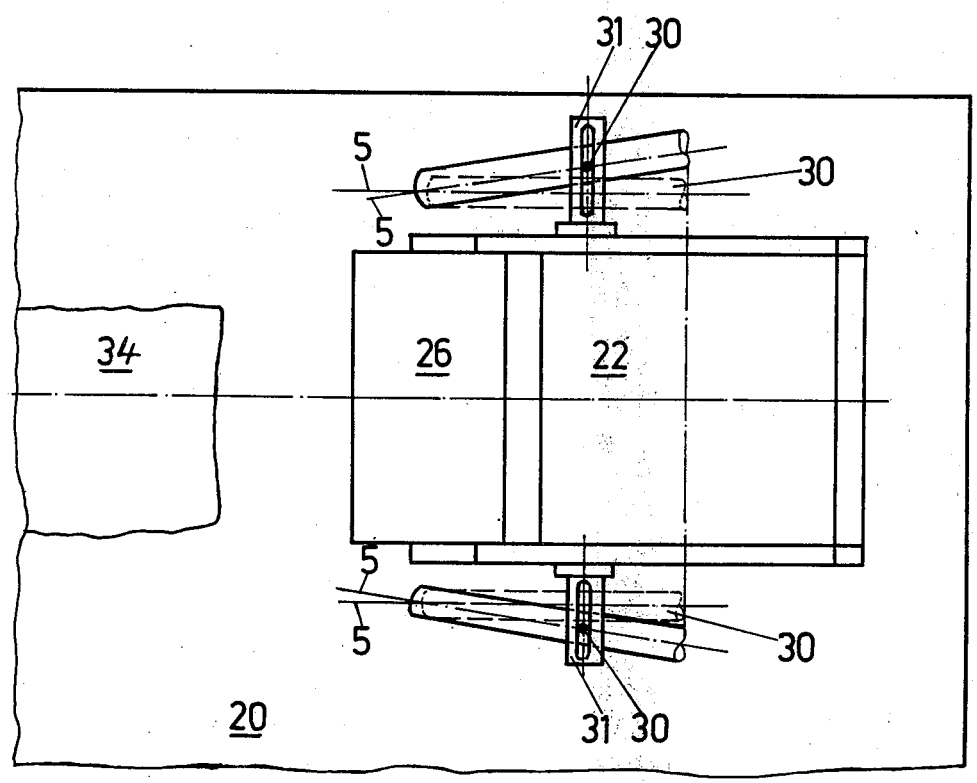
FIG. 3 is a top view of the arrangement of FIG. 2.

In FIGS. 2 and 3 the flame-scarfing torch 22 together with the work piece 20 to be selectively flame scarfed is illustrated in an enlarged scale. On the front flame-scarfing torch end inclined toward the work piece is arranged a powder guide 26 from which by means of a pressure medium (e.g. compressed air) iron powder 28 is supplied to the heating flames emerging from the flame-scarfing torch. Such powder guides, as they are used in the flame-scarfing machine described, are disclosed in the German Pat. No. 1,016,102, for example, and also in the U.S. Pat. No. 3,230,117, the details of which from both patents are incorporated herein by reference thereto.

Arranged on both longitudinal sides of flame-scarfing torch 22 by means of a holder 31, are nozzles which may be adjusted in such a manner that during the flame-scarfing process a lateral overlapping of the flame-scarfing slag and of the melted metal is prevented by the air blast 5 emitted through nozzles 30.

As already mentioned, it is possible by means of the above-described flame-scarfing machine to flame scarf selectively, i.e. only individual spots 34, e.g. cracks or depressions.

Figure 4:
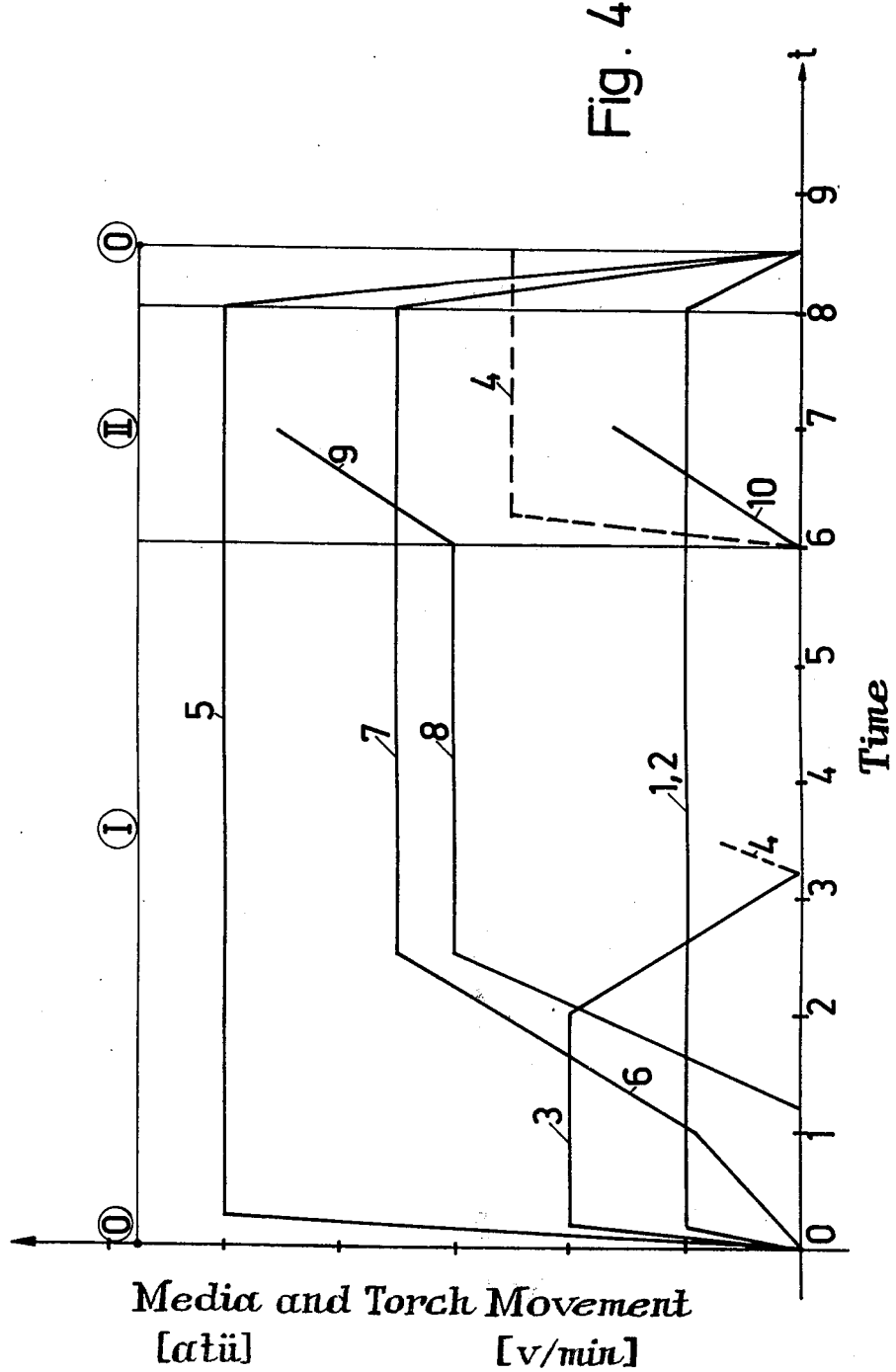
FIG. 4 is a diagram wherein the individual phases of the flame-scarfing procedure are illustrated.

The disadvantages previously appearing in the selective flame-scarfing of such surface faults 34, especially at the end of the fault, are avoided by the flame-scarfing process which is explained by way of the following table together with the diagram illustrated in FIG. 4:

| Process Steps | 0 | 1 | 11 | 0 |
|---|---|---|---|---|
| Media and Flame-Scarfing Torch Movements | | | | |
| 1 | | x | x | |
| 2 | | x | x | |
| 3 | | x | | |
| 4 | (x) | | (x) | (x) |
| 5 | | x | x | |
| 6 | | x | x | |
| 7 | | x | x | |
| 8 | | x | | |
| 9 | | | x | |
| 10 | | | x | |

The meanings therein are:

(a) Process steps  
    0 = starting position  
    1 = start with flowing transition for flame scarfing  
    11 = end of flame-scarfing course (b) Media  
    1 = heating oxygen  
    2 = fuel gas  
    3 = conveying air for Fe powder 28  
    4 = cleansing air  
    5 = lateral air blast 32  
    6 = preflame scarf - $O_2$  
    7 = flame scarf - $O_2$ (c) Torch movement  
    8 = flame scarf advance  
    9 = rapid advance  
    10 = torch lift Prior to the beginning of the actual selective flame-scarfing process, the flame-scarfing torch 22 has already been brought up to fault 34 on work piece 20 to be flame scarfed and takes the position illustrated in FIG. 1 (see also FIGS. 2 and 3 in this connection). This corresponds then also to the process step 0 (start position) in which all media and also the torch movement are turned off.

Only the cleansing air 4, which serves for the purification of the outlet slot for Fe powder from the powder guide 26, may be turned on as the case may be.

With the beginning of the flame-scarfing process (process stes 1 = start with immediate transition to flame-scarfing), heating oxygen 1, fuel gas 2 and the conveying air 3 for the iron powder 28 are turned on simultaneously. The powder is fed into the flame as a preheating step as in conventional operations such as exemplified in German Pat. No. 1,193,342 to increase the preheating temperature and to shorten the time in which the ignition temperature is reached so that the scarfing operation can be started. As in such conventional practices the powder is not used for filling surface defects but rather as a preliminary step in the preheating operation to facilitate the subsequent scarfing. The cleansing air 4 previously turned on, as the case may be, for the Fe powder conduit is now no longer necessary and is turned off.

Aside from these stated media 1–3, there are furthermore turned on, as shown in FIG. 4, the flame-scarfing oxygen 6, 7 and in particular first with a lower pressure (e.g. 0.7 atmospheric excess pressure) for the flaming on, which after a short time (e.g. about 2 seconds) is increased to the working pressure (e.g. 4 atmosph, excess press.) required for flame scarfing.

Since flame scarfing of the faulty area 34 is begun immediately without any appreciable preheating time, the air blast 5 is also turned on emerging from the two nozzles 30 arranged laterally at the flame-scarfing torch 22. These air blast jets 5 limiting the flame-scarfing course, prevent — as stated above — a lateral straying of the liquid flame-scarfing slag, which because of the flame-scarfing oxygen flow is blown only forwards.

With a short timely delay (about 1 sec.) after the start, the flame-scarfing advance 8 is turned on. The advance speed (e.g. 10 m/min.) required for the flame-scarfing is achieved in the shortest time, the flame-scarfing oxygen then simultaneously also exhibiting the working pressure (4 at. exc. press.) required for the flame scarfing. At about this time the conveying air 3 effecting the increase of the preheating capacity is turned off and the powder supply is interrupted. At the same time, the cleansing air 4 may again be turned on and, if necessary, remain in operation up to the end of the flame-scarfing process.

In the exemplary embodiment according to FIG. 4, it is shown that the flame-scarfing of a fault 34 on the work piece surface is completed after 6 seconds. In other words as represented in FIG. 4 about one second after the various operating parameters have been turned on the torch begins to advance or move over the workpiece (see line 8 of FIG. 4) and the scarfing operation is completed six seconds later which is about seven seconds after the operating parameters have been turned on. Thus the traversal over the workpiece for the scarfing operation starts at about the one second time and ends at about the seven second time (which is illustrated in FIG. 4 as step 11). As also shown in FIG. 4, the change in torch speed (line 8) and/or change in torch distance (line 10) begins at about the six second time. Accordingly, the change occurs 6 seconds after the operating parameters have been turned on which is about 6/7 of the time period from the time that the various torch operating parameters have been turned on to the time that the torch has completely traversed the surface defect. Of course, the flame-scarfing procedure with respect to other larger or smaller faults is completed within a different time span.

Upon achieving the process step 11 ( = end of flame-spraying course), media 1, 2, 6, 7, and possibly 4 and the flame-scarfing advance 8 remain turned on, as shown in FIG. 4 and the preceding table.

The flame-scarfing advance 8 is switched to rapid advance (e.g. 30 m/min.) by means of gear 13. Simultaneously with the advance speed change, the flame-scarfing torch 22 is moved vertically upwards from the position shown in FIG. 2 by means of the pneumo-hydraulic device.

By means of these two simultaneously-used torch movements (rapid advance, torch lift) proceeding in two directions at the end of the fault, the effect of the flame-scarfing oxygen on the work piece is gradually diminished; the flame-scarfing oxygen energy no longer suffices for flame spraying. However, the flame-scarfing oxygen further supplied to the flame-scarfing area is sufficient to burn off completely the melted metal driven out in the flame scarfing.

The slag may thereby be removed subsequently without difficulties from the work piece surface by means of a scraper, for example.

In place of the combined step described above, i.e. switching from flame-scarfing advance to rapid advance with the simultaneous torch lift, it is also possible according to the invention to use only one of the steps, i.e. to accelerate the advance speed (from flame-scarfing advance to rapid advance) or alternatively to lift the torch with the advance of the torch remaining constant.

All these possibilities mentioned assure that after the flame scarfing, no burned metal residues (accumulations at the end of the faulty areas) remain on the work piece surface. There also does not result here at the end of the fault any continuation with laterial, lower-lying edges, so that an after processing of the selectively flame-sprayed work piece surface is not required the way it was previously.

After a short time span (2 sec. according to FIG. 4), the switching from process step 11 to step 0 ( = start position) takes place. In this step all media (if necessary, with the exception of cleansing air 4) as well as the rapid torch advance 9 and the torch lift 10 are turned off. The selective flame-spraying procedure is thus completed. The flame-scarfing machine 11 may subsequently be moved on until the flame-scarfing torch 22 takes on a new starting position at another faulty area 34 of work piece 20 and the flame-scarfing procedure is again initiated.

This process described above, which may be carried out according to the invention both on the top surface as well as on the side surfaces, has the advantage that the flame-spraying procedure, as compared to the previously known processes for the selective flame scarfing, proceeds faster, where it is assured according to the invention that the flamed surface area has a clean flame-scarfing picture and requires no aftertreatment.

What is claimed is:

1. In a process for flame-scarfing surface defects on a workpiece such as ingots, slabs or the like by means of at least one flame-scarfing torch characterized in traversing the workpiece until the torch is disposed above the workpiece at the beginning of the surface defect, halting the movement of the torch while the torch is disposed at the beginning of the surface defect, turning on various torch operating parameters including feeding gas to the torch while the torch is halted at the beginning of the surface defect, after the various torch operating parameters have been turned on setting the forward motion parameter of the torch to permit the torch to begin traversing the workpiece over the surface defect, maintaining the gas flow parameter setting unchanged throughout the time and distance that the torch traverses the surface defect, immediately prior to reaching the end of the surface defect changing at least one of the forward motion parameter and distance from workpiece parameter without changing the gas flow setting and with the change in forward motion parameter being an acceleration thereof and the change in distance from the workpiece parameter being an increase in distance thereof to diminish the affect of the flame from the torch while the torch completes its traversal over the surface defect and while the flow of gas is continued to the torch, and thereby continuing to apply the flame of the torch toward the surface defect when the at least one parameter has been changed until the torch has completely traversed the surface defect.

2. In the process of claim 1 wherein the torch operating parameters include feeding heating gas mixture and feeding air blast and feed flame-scarfing powder and feeding flame-scarfing oxygen all of which are turned on simultaneously at the beginning of the flame-scarfing process, and said powder being used to increase the preheating temperature to facilitate the start of the scarfing operation.

3. In the process of claim 1 wherein the torch operating parameters include feeding air blast and the air blast is applied at the sides of the torch to prevent lateral overlapping of any flame-scarfing slag which might be produced by the flame-scarfing process.

4. In the process of claim 1 wherein any slag which might be created by the flame-scarfing process is later removed mechanically without further flame-scarfing thereof.

5. In the process of claim 1 wherein the change in the at least one parameter is made at about 6/7 of the time period from the time that the various torch operating parameters have been turned on to the time that the torch has completely traversed the surface defect.

6. In the process of claim 5 wherein the change in parameter is an increase in forward motion parameter with the increase being an acceleration in speed of about three times the speed of the torch.

7. In the process of claim 6 wherein at the time the various torch operating parameters have been turned on powder is fed in a pressure medium from above the torch toward the flames emerging from the torch to facilitate the preheating of the flames by increasing the preheating temperature, discontinuing the powder feed immediately after the torch has begun to traverse the surface defect at the beginning of the flame-scarfing of the defect, applying cleansing air toward the defect at the same time that the change in forward motion parameter has been made, and increasing the distance from the workpiece parameter at the same time that the forward motion parameter has been changed.

8. In the process of claim 7 wherein the various torch operating parameters include applying a lateral air blast from the sides of the torch to prevent lateral overlapping of any flame-scarfing slag that might be produced by the flame-scarfing process and include feeding scarfing oxygen to the torch and feeding fuel gas to the torch and feeding heating oxygen to the torch and the setting of all such operating parameters being maintained unchanged throughout the entire flame-scarfing process.

9. In the process of claim 1 wherein the change in parameters is an increase in the distance of the torch from the work piece in its flame-scarfing position.

10. In the process of claim 1 wherein the change in parameter is an acceleration of the forward motion of the torch from its flame-scarfing position.

11. In the process of claim 10 wherein the change in parameter is also an increase in the distance of the torch from the work piece in its flame-scarfing position.

12. In the process of claim 10 wherein the forward motion is accelerated at the end of the surface defect to a speed about three times that of the speed of the torch while traversing the surface defect.

13. In the process of claim 12 wherein the forward motion is accelerated from a speed of about 10 m/min. to a speed of about 30 m/min.

* * * * *